United States Patent
Lipton et al.

(10) Patent No.: US 7,274,781 B2
(45) Date of Patent: Sep. 25, 2007

(54) METHOD AND SYSTEM FOR ENHANCEMENT OF CALLER IDENTIFICATION

(75) Inventors: Steven Jay Lipton, Flower Mound, TX (US); Christopher James Dawson, Arlington, VA (US); Rick Allen Hamilton, II, Charlottesville, VA (US); Craig William Fellenstein, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 10/698,145

(22) Filed: Oct. 30, 2003

(65) Prior Publication Data

US 2005/0094788 A1   May 5, 2005

(51) Int. Cl.
*H04M 1/56* (2006.01)
*H04M 15/06* (2006.01)

(52) U.S. Cl. .............................. 379/142.01; 379/93.23; 379/142.17

(58) Field of Classification Search ........... 379/142.01, 379/142.03, 142.06, 142.09, 142.14, 93.17, 379/93.24, 245, 247, 93.23
See application file for complete search history.

(56) References Cited

U.S. PATENT DOCUMENTS

| | | | | |
|---|---|---|---|---|
| 5,343,516 A | * | 8/1994 | Callele et al. | 379/93.05 |
| 5,377,260 A | * | 12/1994 | Long | 379/93.02 |
| 5,745,557 A | * | 4/1998 | Anglikowski | 379/177 |
| 5,764,901 A | * | 6/1998 | Skarbo et al. | 709/204 |
| 5,784,444 A | * | 7/1998 | Snyder et al. | 379/142.01 |
| 5,894,504 A | * | 4/1999 | Alfred et al. | 379/88.13 |
| 5,907,596 A | * | 5/1999 | Karnowski | 379/88.21 |
| 5,933,778 A | * | 8/1999 | Buhrmann et al. | 455/461 |
| 6,067,355 A | | 5/2000 | Lim et al. | 379/142 |
| 6,192,116 B1 | * | 2/2001 | Mayak | 379/142.08 |
| 6,385,303 B1 | | 5/2002 | Peterson et al. | 379/67.1 |
| 6,418,330 B1 | | 7/2002 | Lee | 455/567 |
| 2004/0208302 A1 | * | 10/2004 | Urban et al. | 379/142.17 |

* cited by examiner

*Primary Examiner*—Binh K. Tieu
(74) *Attorney, Agent, or Firm*—David A. Mims; Darcell Walker (57) ABSTRACT

The present invention provides a method and system to enable a caller to send additional information along with the Caller Identification to a telephone receiver at the same time the caller makes the call. This additional information better informs the recipient of the identity of the caller and the nature of the call. This information allows the receiver to decide whether or not to answer the telephone call.

16 Claims, 6 Drawing Sheets

| | |
|---|---|
| 120 | Urgent |
| 125 | Important |
| 130 | Slightly Important |
| 135 | Not Important |
| | |
| 150 | Spouse |
| 155 | Son |
| 160 | Daughter |
| 165 | Mother |
| 170 | Father |
| 175 | Sister |
| 180 | Brother |

Bricks Hardware

816-200-0530

12:55PM  11/26  #12

Stanley

FIG. 11

Unknown Caller

12:55PM  11/26  #16

Dexter

Not Important

FIG. 12

Pay Telephone

124-200-0530

12:10AM  11/26  #3

Stanley

Urgent

FIG. 13

Dexter

Urgent 124-200-0530

FIG. 14

METHOD AND SYSTEM FOR ENHANCEMENT OF CALLER IDENTIFICATION

FIELD OF THE INVENTION

The present invention relates generally to a telephone device for processing caller identification information. More particularly to a method and system for enhancing the caller identification process by enabling a caller to supply additional information about the caller of nature of the call and thereby providing the receiver of a call with more information that will enable the recipient to better determine whether to answer the call.

BACKGROUND OF THE INVENTION

Several telephone companies now offer caller identification (caller-ID) services for telephone users. These services enable the recipient of a call to identify the name and/or the phone number of the caller before choosing to accept the call. Telephone companies also provide a blocking service for those users who wish to remain anonymous.

Devices for processing the caller-ID information, including block codes, have proliferated as well. Typical devices include information processing circuitry in the device, usually comprising a controller and a memory, to show the caller's name and/or phone number on a suitable display device. Some device are further provided with circuitry from comparing the number of a calling party with stored information, and for classifying the call as either "wanted" or "rejected" based on the stored information. When the call is classified as "wanted," the number is displayed to the user and a ring indication is provided to indicate to the user that a desired call has been received. When the call is classified as "rejected," the number is displayed and the ring indication is disabled. An example of such a device is provided U.S. patent application Ser. No. 08/540,532.

A caller-ID telephone is described in U.S. Pat. No. 5,265,145. This device describes a caller-ID telephone, which compares the caller-ID information to stored information in the telephone device. When there is a match, the telephone displays the caller's name and number on the device. In addition, the device includes circuitry for causing the caller-ID device to spelling or speaks the name of the caller for the user.

U.S. Pat. No. 6,067,355 describes a caller-ID device and/or an integrated caller-ID and answering machine device which provides a method and apparatus for displaying caller-ID information for a call-waiting caller simultaneously with the caller-ID information of a present caller and a method and apparatus for enabling a caller-ID device to selectively dial the last seven digits of a phone number, the area code and the last seven digits, or a "1", the area code, and the last seven digits of a phone number.

U.S. Pat. No. 6,498,841 describes a process in which the caller is notified of a call waiting with an audible call-waiting indicator. When standard caller identification is not available, prompting the caller identification provides the call-waiting indicator. In addition, the called party is presented " . . . with call disposition options, such as options to accept or reject the call, route the call to voice mail or send a sales refusal message . . . ". This invention focuses on the called party and party and prompts the caller for identification. The called party is then prompted for a disposition of the call.

U.S. Pat. No. 6,574,319 describes a method and system for providing a called party with audible caller identification information when standard cannot be provided. Calls for which standard caller identification is blocked, unavailable or incomplete are prevented from being connected to the called party. Instead of connecting the calls, a request for audible caller identification information is transmitted to the calling party. If the calling party provides the requested audible caller identification information, the audible information is transmitted to the called party. Although intriguing, this patent focuses on the case where the Caller ID information cannot be provided.

U.S. Pat. No. 6,553,110 provides enhanced "call blocking" features. The caller subscribes to a call blocking service and notifies the call blocking service which dialed telephone numbers are authorized and will be able to receive the caller's telephone information. Attached to the Caller ID information packet is a 2-bit message header. This message header identifies to the called party whether or not the signal is unblocked, blocked or encrypted. When the party receives the telephone call, and if the called party subscribes to the Caller ID service, the called party's caller ID box first checks the message header to see what type of message is being received. If it is a publicly available caller ID, the telephone number is merely displayed on the screen. If it is a completely blocked message, the caller ID box will display a message "UNKNOWN", and block the telephone ring. This invention introduces an intermediate entity, which retains the selective call blocking choices by each subscriber. The message header contents, therefore, are controlled by the call blocking service.

U.S. Pat. No. 6,574,471 describes a apparatus and method for handling incoming calls during an operational mode for a portable intelligent communications device when a user thereof is engaged in a meeting, where the portable intelligent communications device is configured to handle each incoming call in an individual manner. When an incoming call is received while in such operational mode, a plurality of options is generated in a graphical user interface. The user of the portable intelligent communications device then activates one of the options made available for handling each incoming call. This invention focuses on providing t tool for the called party to be able to manage incoming calls, usually assumed to be some form of cellular telephone but not required. The caller is not involved with the disposition of the call.

U.S. Pat. No. 6,580,784 describes a system and method for notifying a user of an urgent telephone message. When a telephone or text message is received by the telephone answering systems, a priority is determined for the message. If the telephone call is identified as an urgent telephone call, the system repeatedly dials the subscriber's telephone in order to notify the user of the urgent message. In one embodiment, multiple locations, such as pager, email addresses, and alternate telephone numbers are contacted in order to information the user of the urgent message. When the user is contacted, the urgent messages are played for the user. A caller ID function can further be included to selectively allow messages to be identified as urgent based upon the identification of the caller. This patent gives the called party the option to define which Caller ID's will be deem as "urgent" and which Caller ID's will be deemed as "normal".

With all of the above-described Caller-ID methods and devices that are currently available, the Caller Identification (ID) functions still only allow for limited information to be displayed at the receiving device. In most circumstances, the receiving telephone, cellular or wired only displays the caller's telephone number. In fewer cases, the name of the caller is displayed to the receiver. With only the telephone number or the caller's name information, there is no way for the receiver to determine the importance or urgency of the incoming call. Furthermore, there is no provision for the caller to indicate the importance of the call at the time the call is initiated. Consequently, the receiver of the call must guess at the importance of the call and/or the nature of the call by using only the caller's name or a displayed telephone number. When a call is placed from a public telephone, the receiver of the call has even less information to make a decision about the incoming call and how to allocate their time.

At the present time, there is no solution today, which allows a caller to send 'urgency' information to a receiver. Usually the caller will have to keep trying to telephone the receiver until he or she answers the telephone. There are technologies, which will automatically re-dial the receiver for a preset number of times before discontinuing the calls. Hence, the frequency of the calls usually indicates a form of urgency. This is obviously extremely inefficient. The current art allows the urgency to be sent when the receiver telephone rings to allow a snap decision as to whether the answer the telephone.

The ability for the telephone caller to be authenticated by the receiver when calling from a public telephone where the Caller ID is not enough information for the receiver. Today, the Caller ID is available for most telephone services where the receiver of a telephone call is alerted to which telephone number from which the caller is calling. Whilst this works well from cellular networks where there is a 1 to 1 mapping between cellular telephone and caller (i.e., I have my own personal cellular telephone) it does NOT work well for public telephones. Consider the following example:

Imagine that a teenager's car breaks down and the teenager walks into the "Bricks 'R Us" store to call their parents. When the telephone rings, the parents see "Bricks 'R Us" on the caller ID, and nominally elect not to answer it. However, that Caller ID value is followed by information, which tells parents that it is actually their child who is using the telephone. If the parents knew that their child was on the other end of the line, so the parents would answer the telephone.

This example illustrates a deficiency in the caller identification technology implemented today. The ability for the telephone caller to send arbitrary information to be appended to the Caller ID such that the receiver's device can receive and display the extra information without the receiver having to answer the telephone. The example above can be extended to allow arbitrary information to be sent along with the Caller ID to the receiver to allow the receiver to know whether to answer the call. Today, there is a pager service and SMS (short messaging service), which can be used to 'text' a receiver arbitrary information. SMS allows a caller to pre-send information to alert the receiver to answer a call, but this feature is NOT real time. Specifically, the text message must be sent first, and separately. The current art solves this problem where this arbitrary information can be sent AT THE SAME TIME that the call is mode, so that the receiver can make a real time decision to answer the telephone.

There remains a need for a caller identification method and system that will enable a caller to supply additional information about the caller identity and/or the nature of the call to be sent at the time of the call. The specific need that deserves attention is the capability to allow for a telephone caller to send additional information to the receiver, as specified by the caller, before the receiver answers the telephone. To accomplish this task it is necessary to address three main issues: 1) How can the telephone caller transmit urgency information directly to the receiver's Caller ID display, so that the receiver will not be required to answer the telephone to determine call urgency?; 2) How can the receiver of a telephone call authenticate the caller when the call is from a public telephone where Caller ID information is uninformative?; and 3) How can the telephone caller send arbitrary information to be appended to the caller ID such that extra information will be displayed without the receiver having to answer the telephone? The present invention will provide solutions to issues and describe other features that will enhance the telephone caller identification process.

SUMMARY OF THE INVENTION

An objective of the present invention is to provide a method and system for enhancing the process of identifying the caller.

It is a second objective of the present invention to provide a method and system that will enable the caller to supply to more about the identity of the caller and/or the nature of the call.

It is a third objective of the present invention to display additional at the receiver location about the identity of the call and/or the nature of the call.

It is a fourth objective of the present invention a set of procedures for the caller to enter information about the identity of the caller and/or the nature of the call.

It is a fifth objective of the present invention to provide a method and system format the information in a caller such that a receiver location can detect the presence of additional caller identification information.

It is a sixth objective of the present invention to provide a method for unique caller identification codes between caller and recipient.

The present invention provides a method and system to enable a caller to send additional information along with the Caller Identification to a telephone receiver at the same time the caller makes the call. This additional information better informs the recipient of the identity of the caller and the nature of the call. This information allows the receiver to decide whether or not to answer the telephone call. The additional information sent with the call can enable the recipient to determine the following:

Who is calling?

What is the urgency of the call?

Any other important information needed to make the decision as to whether to answer the call.

The process for the caller to provide additional information about the caller (Who is calling?) could include these steps:

1) Caller is using public telephone—that is, a telephone where the Caller ID will NOT allow the receiver to identify the caller.
2) Caller dials up the receiver using the telephone keypad
3) Caller ID information is sent to the receiver in the usual way.
4) The caller now has a chance to append the Caller ID with identity information entered using the telephone keypad. This information can be either just numbers or alphanumeric characters using the ABC=1, DEF=2 system.
5) Receiving person's telephone rings. Looking at the display on the telephone, the receiver can see the information about the caller.

6) Receiver bases his decision to answer the telephone on the identity of the caller.

As indicated, this method is beneficial when calling from a public or pay telephone.

An implementation of a method of the present invention for indicating the urgency of the call could include these steps:
1) Caller dials up the receiver using the telephone keypad
2) Caller ID information is sent to the receiver in the usual way
3) The caller now has a chance to append the Caller ID with information regarding the urgency of the call: For example 1=Very Important, 2=Important, 3=Not important
4) Receiving person's telephone rings. Looking at the display on the telephone, the receiver can see the urgency information from the caller.
5) Receiver bases his decision to answer the telephone on the urgency of the call.

A method that allows the caller to provide general information about the call could include these steps:
1) Caller dials up the receiver using the telephone keypad
2) Caller ID information is sent to the receiver in the usual way
3) The caller now has the chance to append the Caller ID with arbitrary information entered using the telephone keypad. This information can be either just numbers or alphanumeric characters using the ABC=1, DEF=2 system.
4) Receiving person's telephone rings. Looking at the display on the telephone, the receiver can see the arbitrary information from the caller.
5) Receiver bases his decision to answer the telephone on the information sent by the caller.

In the process of the present invention, the caller can input the desired telephone. The caller can then input additional information to further identify the caller and the nature of the call. The caller can input a code such as '*4' that will activate the process to allow the caller to input information in addition to the telephone number. Once this code is detected, the caller will be prompted to insert additional information. The information can be of different types. There can be some standard messages to indicate caller identity such as 'spouse', 'brother', 'sister', or 'son'. Each standard message has a corresponding code to indicate the message. After the caller is prompted to insert information, the caller can input a message type code indicating the type of message followed by the message. The message can very with regard to the message type. Message types can include (1) a standard message as described above such as spouse or son, (2) a text message wherein the caller inputs one or more words to indicate caller identification or nature of the message such as 'urgent' or (3) a unique message system between parties. This unique message system can be one that both parties agree to use and both parties know the meaning of each message that one party receives when the other party calls. The caller can also input an end code signifying that the caller has completed the insertion of additional information. After receiving the end prompt, the process will transmit the information to the telephone number of the recipient of the call for display at the recipient location.

DESCRIPTION OF THE INVENTION

The present invention provides a method that enables a caller to determine and provide specific and custom information about the caller and the nature of the call. Although, there are many features currently available related to various aspects of caller identification, none of these features gives the caller the flexibility to provide custom information to the call recipient.

Figure 1:
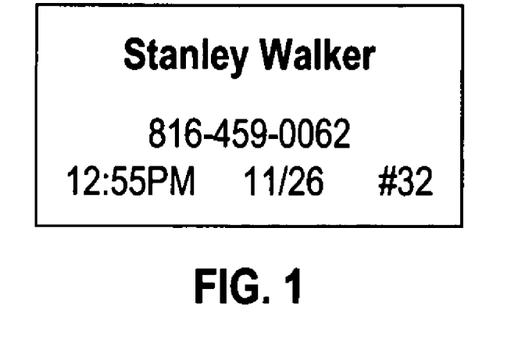
FIG. 1 is an illustration of the information in a conventional caller identification display.

FIG. 1 illustrates a current caller identification display at a recipient location. As shown, line 20 displays the name of the caller. This name is actually the name of the person subscribing to the telephone company. As a result, the name appearing on the display may not be the one making the telephone call. Line 21 shows the number of the telephone from which the call is placed. Line 22 gives the date and time of the call. Line 23 in this illustrates is a count of the number of calls received by the recipient location. With this current method, the caller does not influence any of the information in the display.

Figure 2:
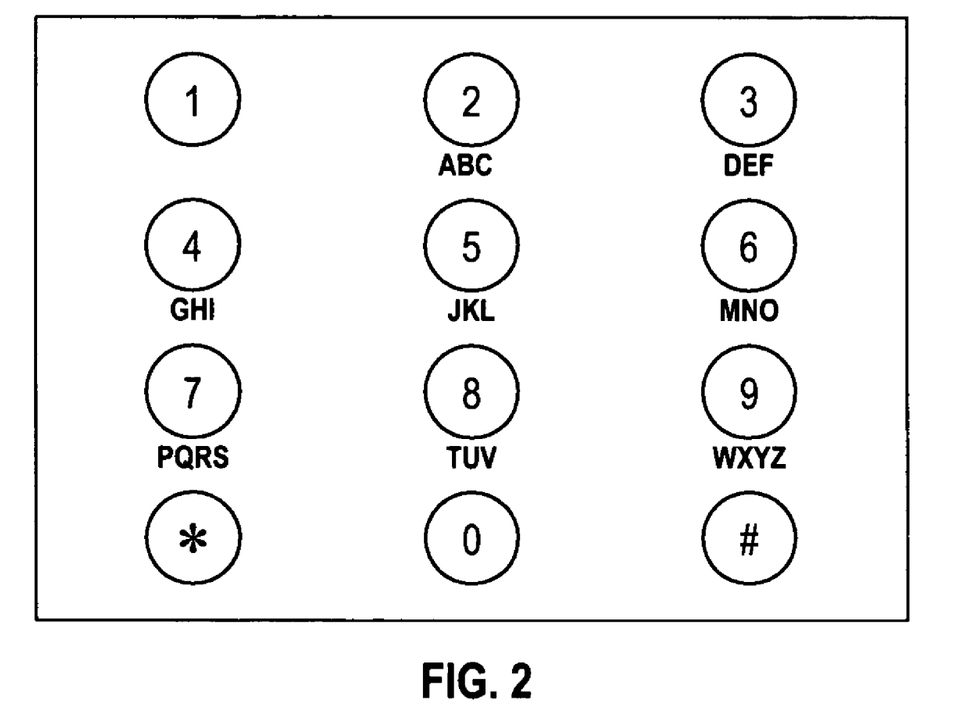
FIG. 2 illustrates the conventional telephone keypad used to input caller information.
Figure 3:
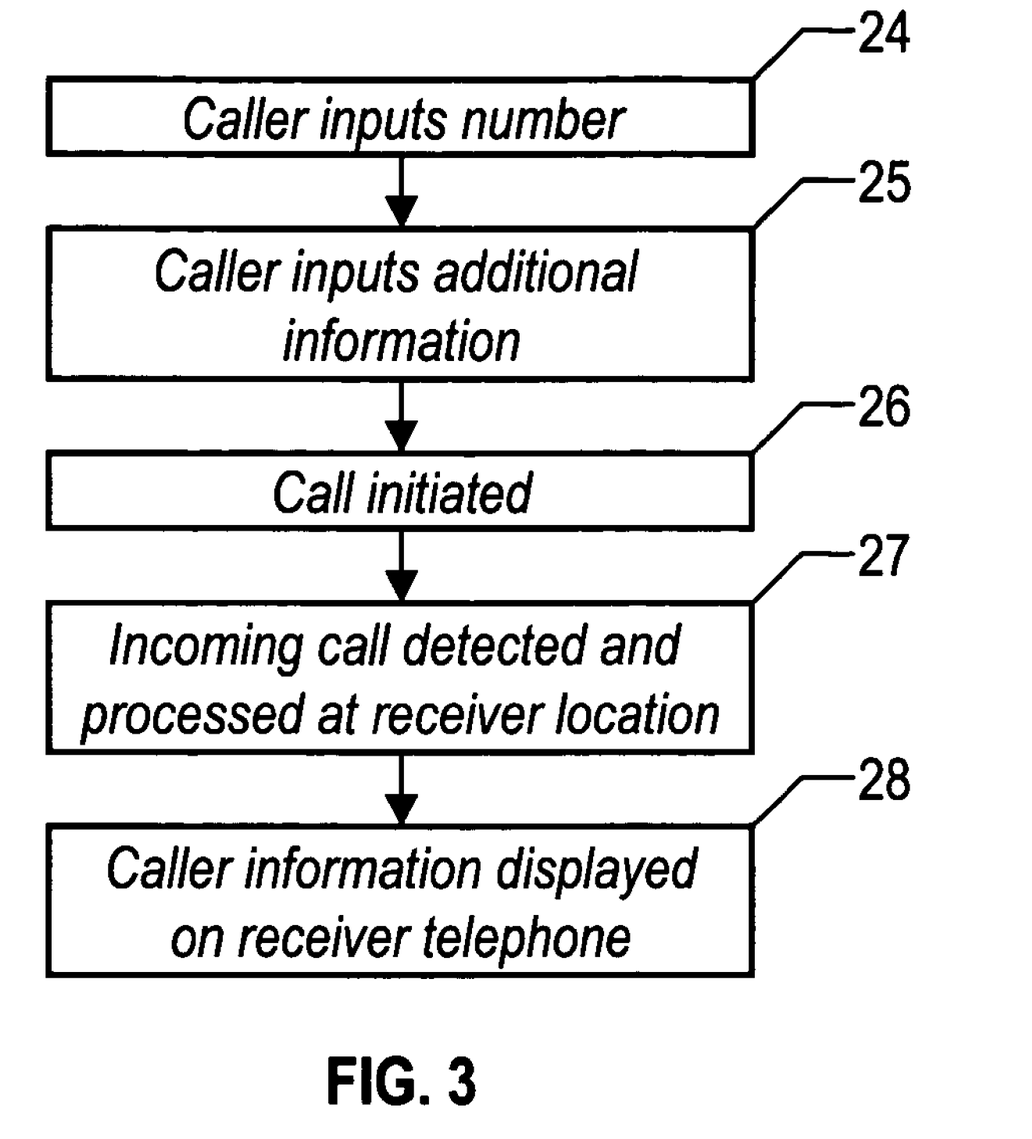
FIG. 3 is a flow diagram illustrating the basic activities in the implementation of the present invention.

FIG. 2 shows the standard touch-tone telephone keypad which the caller inputs information. FIG. 3 is a flow diagram illustrating the basic activities in the implementation of the present invention. As shown, in step 24, the caller can first inputs the telephone number. At the completion of the number input, step 25 enables the caller to input additional information related to the identity of the caller of the nature of the call. Once the caller has input the additional information, step 26 initiates the call. Referring to step 25, the caller may decide not to provide any additional information. In this event, there will be no step 25 in the process for that call.

At the receiver location, the incoming call is detected as usual in step 27. However, in addition to detecting the number from which the call is placed, the call can have an indicator to alert the receiver location that additional information is present with this call. If the additional information indicator is present, step 27 also processes the additional information, as will be described later, for display to the call recipient. Step 28 displays all of the caller information, such as shown in FIGS. 11 through 14.

Figure 4:
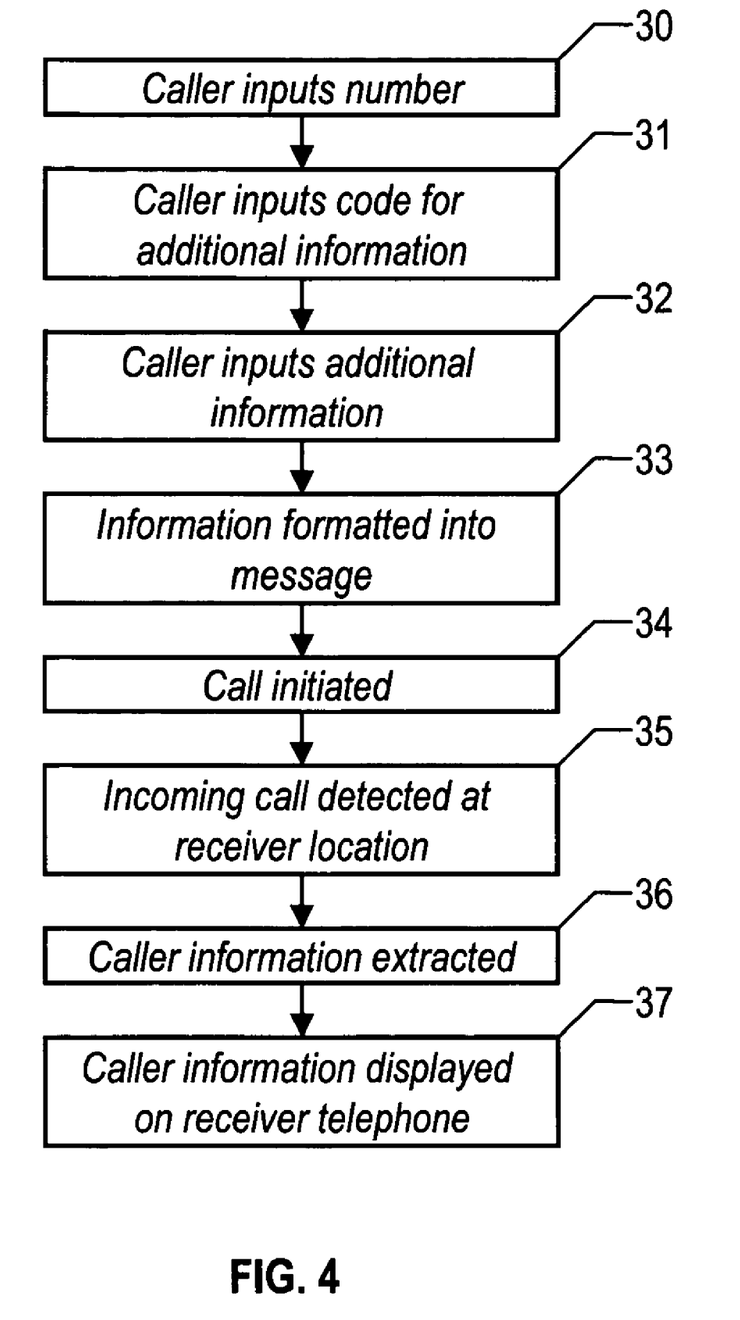
FIG. 4 is a flow diagram illustrating detailed steps in the implementation of the present invention.
Figure 7:
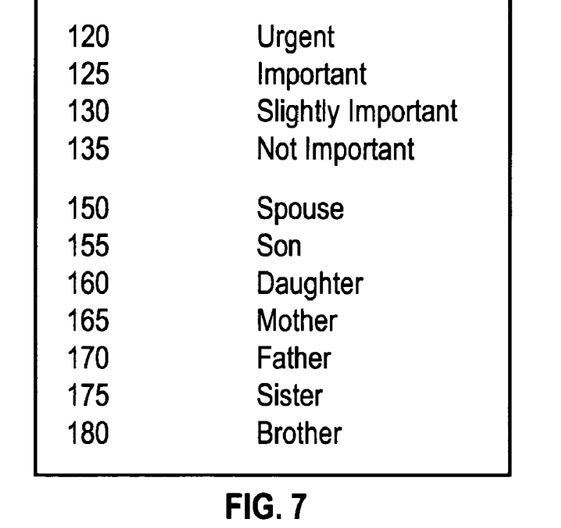
FIG. 7 is a list of possible messages and corresponding codes.

FIG. 4 is a flow diagram illustrating a detailed embodiment of the present invention. As with FIG. 3, in step 30, the caller inputs the desired number through the keypad shown in FIG. 2. To activate the process to submit additional information with the call, the caller can input a code in step 31. This code can be for example '*4'. Other codes are currently used initiate other telephone functions such as '*67' that activates an automatic redial function. In the alternative, there can be a feature that automatically queries the caller to determine if the caller desires to submit additional information. This prompt can also be in response to the code inputted in step 31. If the caller indicates in step 31 the desire to supply additional information, a record of the information can be created to contain the information supplied by the caller. At this point, step 32, the caller can input the additional information. FIG. 7 illustrates a list of possible messages and corresponding codes the caller can use to provide the additional information. As shown, each code corresponds to a different caller identity or different message description.

Figures 5, 6:
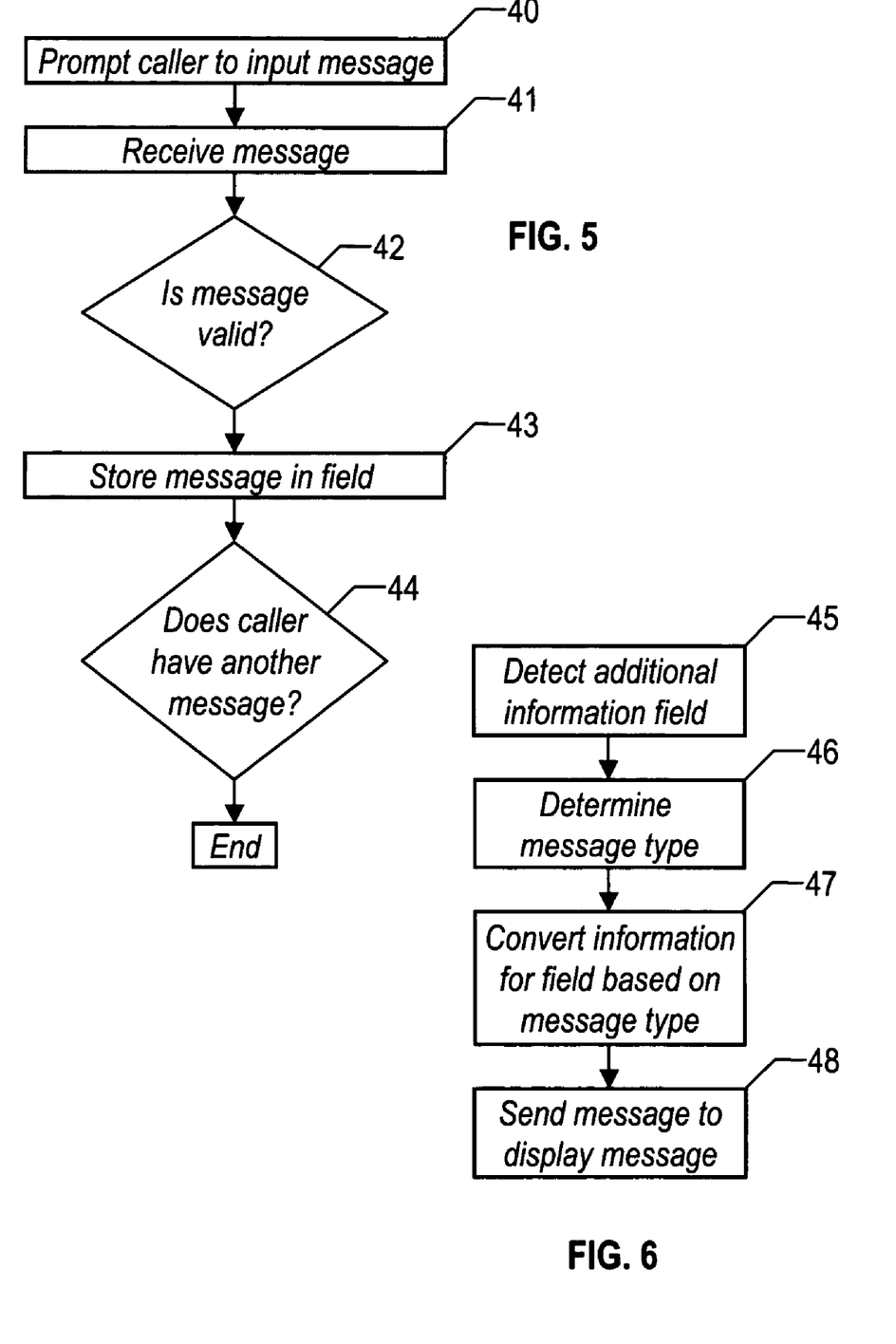
FIG. 5 is a flow diagram illustrating the steps involved in the process of inputting additional caller identification information.
FIG. 6 is a flow diagram of the activities related to the detection and display of additional caller identification information.

Referring back to FIG. 3, step 33 will format the information supplied by the caller. Because the present invention provides the caller with the ability to provide custom information, it may be necessary to get the information in a uniform format such that the receiver can readily interpret and display this information. FIG. 5 further illustrates this formatting process. Step 34 initiates the call. Step 35 detected the incoming call at the call receiver location. Step 36 extracts the information transmitted with the call. This step will be further described in FIG. 6. At this point, step 37 displays the caller information at the receiver location.

Figure 8:
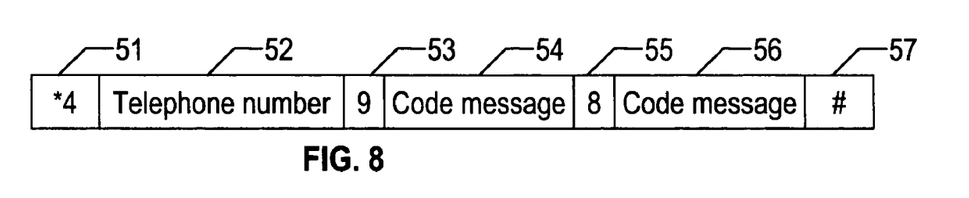
FIG. 8 is an illustration of the fields in a formatted record of the information contained in a transmitted call in accordance with the present invention.
Figure 9:
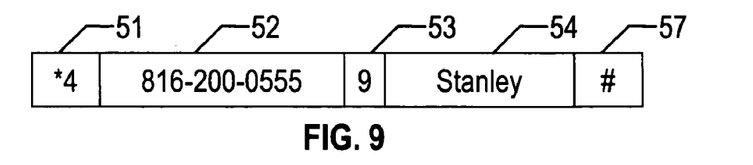
FIG. 9 is an illustration of an alternate embodiment of the fields in a record of caller information in accordance with the present invention.
Figure 10:
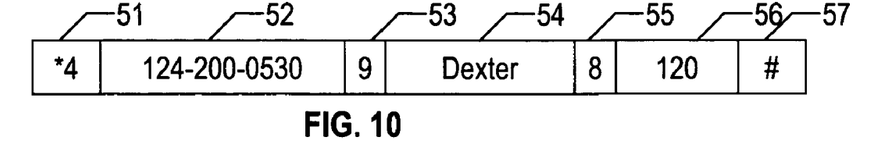
FIG. 10 is an illustration of another alternate embodiment of the fields in a record of caller information in accordance with the present invention.

FIG. 5 is a flow diagram illustrating the steps involved in the process of inputting additional caller identification information as indicated in steps 32 and 33. As mentioned, the caller can receive a prompt to supply additional information. As mentioned, because the caller specifically supplies the information, there may be a need to generate a basic format for this information. FIGS. 8, 9 and 10 provide various formats for supplying this information.

FIG. 8 is an illustration of the fields in a formatted record of the information contained in a transmitted call in accordance with the present invention. The information record 50 can have various code and message fields. Field 51 is the code field to indicate that the caller wants to supply additional information with the call. At the receiver location, the detection of this code will activate the process described in FIG. 6 that will interpret the information in the message. Field 52 contains the desired telephone number. Field 53 can be field that indicates a specific message type. Present invention allows for messages as indicated in FIG. 7. However, the caller can still submit additional messages types. These message types can be standard code messages indicated in FIG. 7 or text messages. The number '9' in field 53 can be the code for a text message. Field 54 can be the actual message. The text message can be one in which the caller inputs his or her name. This type of information unique usually will not be included in a standard information format. Field 55 can be the code for additional information. This code '8' can be the code for indicating the nature or urgency of the call. Following this code field will be the field 56 containing the description of the call. These descriptions can be standard descriptions as shown in FIG. 7. For example, inputting 120 in field 56 will indicate to the recipient of the call that the call is urgent. When the caller has completed inputting the additional information, the caller can indicate the end of the call by inputting an 'end message' symbol such a '#' in field 57. FIGS. 8 and 9 also illustrate various messages formatted in accordance with the present invention.

Referring back to FIG. 5, as mentioned step 40 would prompt the caller to supply the message information. Step 41 will receive the message information. Because the message has to fit the format described in FIG. 8, step 42 verifies that all of the designated fields have the appropriate information. For example, by entering of code 8 in field 55, the caller must supply an appropriate code in the corresponding field. If the caller attempted to enter a text message, the method would reject that entry. If the message is appropriate for the corresponding code field, step 43 enters that information in the record 50. At this point, step 44 determines whether the caller wants to add more information to the message. This step examines the next field in the record. If the next field contains an 'end message' symbol '#', the process terminates as the message is complete. If a message code is detected the process returns to step 42 to verify the information in the message field.

FIG. 6 is a flow diagram of the activities related to the detection and display of additional caller identification information. These activities further describe step 36 in FIG. 4. Step 45 detects that the field 51 of the incoming call has a designation that the caller has supplied additional information about the call. The next field in the format is the telephone number. Step 46 detects the message type. Step 47 will convert the code in the message field to a corresponding message in accordance with FIG. 7. A code of 150 in the message field will equal the 'spouse' designation. Step 48 will display 'spouse' as part of the message. The call recipient will be able to see the their spouse is the person making the call regardless of the number being displayed in the message.

Figure 11:
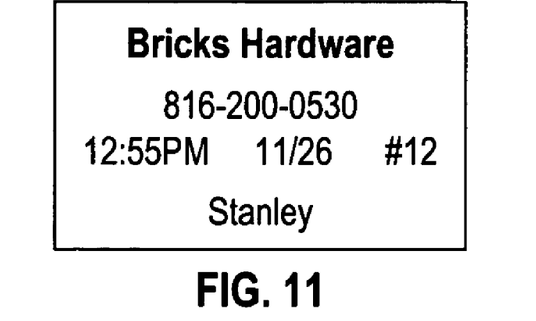
FIG. 11 is an illustration of a display containing the name of the actual caller.

FIG. 11 is an illustration of a display containing the name of the actual caller. As shown, this display contains the name the location, Bricks Hardware, from where the caller is placing the call. Also shown is the telephone number, the date and time of the call the number of the call. The actual caller is Stanley. The capability to designate the actual caller name is not available with any current caller identification methods.

This message in FIG. 11 contains a text message 'Stanley'. To input this message, the can be system whereby the caller will use the alphanumeric characters on the keypad to spell out the name 'Stanley'. Eight keys 2 through 9 represent the 26 alphabets. To designate a particular letter, the caller would press that key a number of times that corresponds the position of the letter at that key. The 'S' in Stanley is the fourth letter of key 7. To designate the letter 'S' the caller would press the 7 key 4 times. To spell the remainder of the name, the caller would press the 8 key once (t), the 2 key once (a), the 6 key twice (n), the 5 key three times (l), the 3 key twice (e) and the 9 key three times. FIG. 8 is an illustration of a record formatted in accordance with the present invention for the display in FIG. 11.

Figure 12:
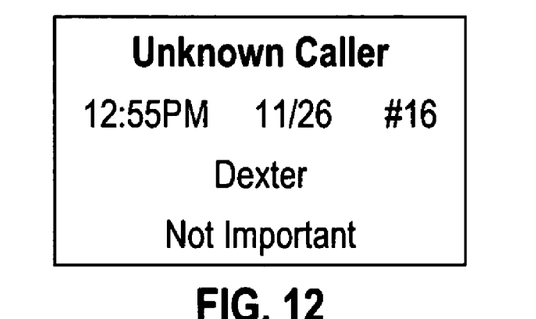
FIG. 12 is an illustration of a display containing the name of the caller and the general nature of the caller.
Figure 13:
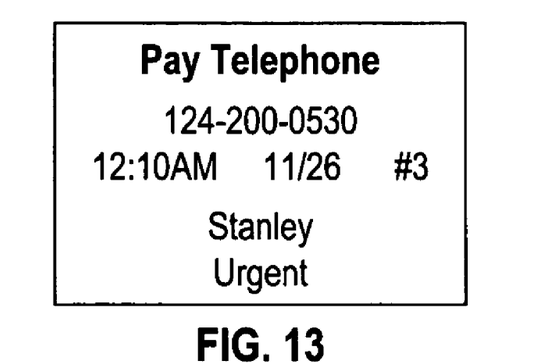
FIG. 13 is an illustration of information in the display of the present invention when the call is from a pay telephone not containing the local network.

FIG. 12 is an illustration of a display containing the name of the caller and the general nature of the caller. In this display the location of the call and the number are unknown. The caller can indicate his name as 'Dexter'. As mentioned, this information is a text message. The caller can also designate the type of call as 'urgent'. FIG. 10 illustrates a record formatted to contain the information in this call.

Figure 14:
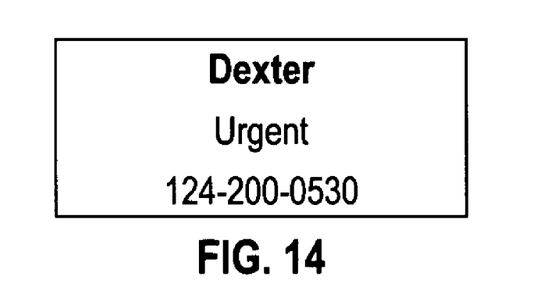
FIG. 14 is an illustration of a display which only shows the additional caller identification information.

Figures are other examples of caller displays in accordance with the present invention. If the caller desires to input information that it cannot all fit in the display, this added information will have priority in the display. FIG. 14 is an example of this situation. The caller's name and the nature of the call will appear on the display before the number from which the caller is making the call. The added information will have priority over the standard information when there is more information than space in the display.

The invention can be built upon current cellular and landline telephone networks. Adding a few extra characters of information can augment the method by which the Caller ID information is sent to the receiving telephone. This information is sent along with the Caller ID. To enable this, the telephone exchange service would be configured to allow the caller to press keys on the telephone keypad before the receiving person's telephone is told to ring. This additional user defined bytes would be generated and passed in addition to the existing caller ID fields. Although fixed length fields could be employed, e.g., one byte, two, or three, another implementation methodology would permit a variable length field to be entered and passed along. This variable length field could be truncated by entry of a specified pattern or key (e.g., the "*" key) on the handset, signifying that the user had completed his or her customization/appending of caller ID data. This information is then transmitted using legacy means to appear on an LCD display on the telephone—the same one that shows the Caller ID information today.

The present invention, in contrast, focuses on the caller. The caller is able to select the kind of message that goes to the kind of message that goes to the called party. The present invention bears some similarity with this patent because both inventions address the issue of caller identification/authentication when the Caller ID information is incomplete, such as a call from a pay telephone. However, the inventions are different in their approach, with the present invention providing more flexibility.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

Having thus described the invention, what we claims as new and desire to secure by Letters Patent is set forth in the following claims.

We claim:

1. A method for enhanced telephone caller identification wherein the caller supplies information related to the call, the method comprising the steps of:
   receiving calling information to initiate a telephone call;
   determining whether caller has supplied information related to the call in addition to telephone number;
   verifying that a message has a valid format;
   storing the information when there is determination that the caller has supplied additional and valid information about the telephone call;
   transmitting the calling information to the destination of the telephone entered by the caller;
   detecting whether the caller has indicated additional information is submitted with the call;
   formatting the information supplied by the caller when the determination is that the caller has supplied additional information; and
   displaying the additional information supplied by the caller at the destination of location of the call along with a number of the origination of the call.

2. The method as described in claim 1 wherein said information formatting step further comprises: creating a record having a plurality of fields; and reading the information supplied by the caller and verifying the supplied information to determine whether the supplied information for each field of the record is valid.

3. The method as described in claim 2 wherein said storing step further comprises storing the verified information in the appropriate field in the record.

4. The method as described in claim 3 wherein said displaying step further comprises the steps of: detecting an incoming call with a record containing additional information about the call; reading the various sets of information contained in the fields in the record; converting the information in the record into a message for display based on the code of the message type field and the content of the message field; and displaying the converted information on the screen of the recipient.

5. The method as described in claim 4 wherein said converting step further comprises: reading a message field from the record; determining the content of the message field; reading the content field associated the message field; determining the message associated with the content of the message field; and displaying the message associated with the content of the message field.

6. The method as described in claim 5 wherein said message-determining step further comprises matching the content of the message field with a set of corresponding caller identifiers.

7. The method as described in claim 5 wherein said message-determining step for a text message supplied by the caller further comprises determining each character in the message by comparing the number of tones to a set of alpha-numeric characters, each character corresponding to a specific number of a touch tone.

8. A method for enhanced telephone caller identification wherein the caller supplies information related to the call, the method comprising the steps of:
   receiving calling information to initiate a telephone call;
   determining whether caller has supplied information related to the call in addition to telephone number;
   verifying that supplied information has a valid format;
   storing the information when there is determination that the caller has supplied additional information about the telephone call;
   transmitting the calling information to the destination of the telephone entered by the caller;
   displaying the additional information supplied by the caller at the destination of location of the call along with a number of the origination of the call, by:
   detecting an additional message flag during an attempt to connect with the recipient telephone; reading the fields of a record during the connection attempt;
   detecting the message code for an additional message;
   reading the content of the message field for the additional message;
   converting the content of the message field into a message, said conversion being based on the message type and the content of the message field; and displaying the converted message on the screen at the recipient location as the connection attempt occurs.

9. A computer program product in a computer readable medium for enhanced telephone caller identification wherein the caller supplies information related to the call, the program comprising:

instructions for receiving calling information to initiate a telephone call; instructions for determining whether caller has supplied information related to the call in addition to telephone number;

instructions for verifying that a message has a valid format;

instructions for storing the information when there is determination that the caller has supplied additional and valid information about the telephone call;

instructions for transmitting the calling information to the destination of the telephone entered by the caller;

instructions for detecting whether the caller has indicated additional information is submitted with the call;

instructions for formatting the information supplied by the caller when the determination is that the caller has supplied additional information; and instructions for displaying the information supplied by the caller at the destination of location of the call.

10. The computer program product as described in claim 9 wherein said information formatting instructions further comprise instructions for: creating a record having a plurality of fields; and reading the information supplied by the caller and verifying the supplied information to determine whether the supplied information for each field of the record is valid.

11. The computer program product as described in claim 10 wherein said storing instructions further comprise instructions for storing the verified information in the appropriate field in the record.

12. The computer program product as described in claim 11 wherein said displaying instructions further comprise instructions for:

detecting an incoming call with a record containing additional information about the call;

reading the various sets of information contained in the fields in the record; convert the information in the record into a message for display based on the code of the message type field and the content of the message field; and displaying the converted information on the screen of the recipient.

13. The computer program product as described in claim 12 wherein said converting instructions further comprise instructions for: reading a message field from the record; determining the content of the message field; reading the content field associated the message field; determining the message associated with the content of the message field; and displaying the message associated with the content of the message field.

14. The computer program product as described in claim 13 wherein said message-determining instructions further comprise matching the content of the message field with a set of corresponding caller identifiers.

15. The computer program product as described in claim 13 wherein said message-determining instructions for a text message supplied by the caller further comprise instructions for determining each character in the message by comparing the number of tones to a set of alpha-numeric characters, each character corresponding to a specific number of a touch tone.

16. The computer program product as described in claim 9 whereas said displaying instructions further comprise instructions for:

detecting an additional message flag during an attempt to connect with the recipient telephone;

reading the fields of a record during the connection attempt; detecting the message code for an additional message;

reading the content of the message field for the additional message;

converting the content of the message field into a message, said conversion being based on the message type and the content of the message field; and displaying the converted message on the screen at the recipient location as the connection attempt occurs.

* * * * *